United States Patent [19]

Hensley

[11] 4,151,656

[45] May 1, 1979

[54] MANUALLY MANIPULATABLE GYROSCOPE-STABILIZED INDICATING APPARATUS AND METHOD FOR ITS USE

[75] Inventor: Ricky D. Hensley, Gate City, Va.

[73] Assignee: Eastman Kodak Company, Rochester, N.Y.

[21] Appl. No.: 832,311

[22] Filed: Sep. 12, 1977

[51] Int. Cl.$^2$ ............................................... G01C 19/00
[52] U.S. Cl. ....................................... 33/321; 33/328; 33/351
[58] Field of Search ................. 33/351, 353, 322, 321, 33/318, 374, 375, 376, 395, 90, 88, 328, 352, 354, 329

[56] References Cited

U.S. PATENT DOCUMENTS

| 875,243 | 12/1907 | Cramer | 33/374 |
|---|---|---|---|
| 898,092 | 9/1908 | Carrier | 33/352 |
| 964,066 | 7/1910 | Sprenkle | 33/351 |
| 1,856,436 | 5/1932 | Schueller | 33/322 |
| 2,487,809 | 11/1949 | Hoover et al. | 33/328 |

FOREIGN PATENT DOCUMENTS 76108   5/1917   Switzerland ................. 33/352

*Primary Examiner*—Richard E. Aegerter
*Assistant Examiner*—John W. Shepperd

*Attorney, Agent, or Firm*—Malcolm G. Dunn; Daniel B. Reece, III

[57] ABSTRACT

A manually manipulatable gyro-stabilized indicating instrument which may be used by pipefitters, carpenters, builders, land and road graders and the like for solving a construction problem involving determining the orientation in space of an unknown geometrical plane with reference to a known geometrical plane, or using a known or unknown geometrical plane as a reference and either establishing in space a geometrical plane having a predetermined orientation with reference to the known or unknown geometrical plane. The instrument has at least one straight planar surface and a gyroscope or gyroscopes operatively connected to the straight planar surface and having motive means for driving the gyroscope or gyroscopes to a continuous stabilized condition relative to the straight planar surface in any fixed position and location assumed by the straight planar surface at the time the gyroscope becomes gyroscopes become stabilized. An indicator arrangement is connected to the straight planar surface and to the gyroscope or gyroscopes in such manner as to indicate the orientation in space of the straight planar surface relative to its orientation in its fixed position when the instrument is moved out of its fixed position.

A bubble device may be provided to assist the gyroscope or gyroscopes in determining orientation in space of the straight planar surface of the support.

5 Claims, 6 Drawing Figures

MANUALLY MANIPULATABLE GYROSCOPE-STABILIZED INDICATING APPARATUS AND METHOD FOR ITS USE

BACKGROUND OF THE INVENTION

The present invention is directed to a method and to a manually manipulatable, gyro-stabilized indicating apparatus for practicing the method by which pipefitters, carpenters, builders, land and road graders and the like may solve construction problems involving determining in space the known or unknown orientations of structures, road grades and the like with reference to fixed or desired known or unknown orientations.

A carpenter's or builder's level or instrument usually has one or more bubble devices mounted in a longitudinal member having at least one flat surface for determining by gravity whether or not a surface is on an even horizontal plane or for adjusting a surface to such plane. It may also be used to determine whether or not an upright surface is "in plumb" or at 90° or at a right angle with respect to a horizontal surface. The bubble device may be a glass or clear plastic tube partly filled with ether or alcohol or other suitable medium so as to leave an air bubble that moves to the exact center of the tube when an instrument, for instance, is on an even horizontal plane. This instrument, however, cannot be used to determine a desired angular orientation of a surface within a horizontal plane.

For example, in constructing and welding together pipelines where it is desired to construct laterals, which may be branch lines extending from the main line at less than 90°; tees, which are lines extending at right angles; elbows, which extend usually at 90° and 45°, elaborate pre-constructed jigs may be used to hold the structures at the desired angle for welding. Conventional carpenter's or builder's levels with one or more bubble devices have also been used by rotating or turning over the entire pipe structure until it is positioned in a manner that such instrument may be used to determine an angle that otherwise in the normal erected position would be within a horizontal plane. This, however, is a cumbersome procedure and can become quite awkward if not impossible in some situations.

In putting together larger structures, such as structural frames for buildings, a surveyor's transit instrument may be used in some instances.

Gyroscopes are well known in the art. Their spinning wheels tend to "remember" their position in space, following the law that a rotating mass will keep turning about its axis (the imaginary line around which it revolves) unless acted upon by some angular torque, i.e., a single force that produces a twisting rotation. In other words, a spinning mass wants only to keep spinning forever in the same way, at the same speed, on the same axis (assuming, of course, air and bearing friction did not act to slow it down and eventually stop it). As long as the rotating mass or spinning wheel continues to spin or rotate, the axle of the wheel tends to remain pointing at a fixed spot in space unless an outside force shifts it. "Gyroscopic inertia" is that property of a gyroscope which causes it to maintain the direction of the spin axis in space provided that any force acting on it does not cause a torque around any axis other than the spin axis. "Precession" is the response of a rotating mass or spinning wheel to any force tending to change the position of its spin axis. It is the turning movement of the gyroscope in space occurring when a force acts on it in such a way as to cause a torque around any axis other than the spin axis. A simple top turning clockwise, for instance, is an example of a rotating mass. If without slowing its rotation, a tilt force can be applied in a northerly direction (in other words, a direction away from the person applying the force), instead of heeling over toward the north, the top will tilt to the right or eastward. It thus has precessed; i.e., turned the effort around a corner or 90 degrees from its original direction. If the tilt effort were in a southerly direction, the top would precess to the west. If the top were turning counterclockwise, the direction of precession for each tilting force would be reversed from that described above. If the top were changed to a wheel and placed in a frame, the northerly-applied tilt is really a torque around the west-east axis, while precession occurs around the north-south axis. Precession, therefore, makes the spin axis tend to align itself with the torque axis; i.e., not with the direction of one's push, but rather with the axis around which the push is applied, which is 90 degrees around.

Gyros may be mounted so that they have a single pair of gimbal bearings for tilting freely about one axis (called "a single-degree-of-freedom gyro"). The gimbal can rotate freely around an "output axis" perpendicular to the axis of the wheel's spin. If mounted in an aircraft, any turning motion of the aircraft around the "input axis" (for example, a turn of the horizontal heading) produces a torque about the output axis that counteracts this motion and thus holds the gyroscope platform in a stable position.

If a gyro gimbal is mounted in a second ring or frame (gimbal) on suitable bearings, it is called a "two-degree-of-freedom gyro".

Gyros have been and are employed for many applications, including providing an artificial horizon aboard ships for taking sextant readings; serving as part of a torpedo steering mechanism; serving to stabilize and reduce the degree of roll of a ship; used in guidance systems for space vehicles; used in airplanes to indicate the altitude of an airplane at any moment and through a full 360 degrees of roll and pitch; as part of a compass for ships; as part of an automatic pilot to hold an aircraft in straight and level flight, to mention only a few uses. Gyros also serve as part of an apparatus for surveying base holes for oil wells and the like, such as described in U.S. Pat. No. 2,857,677.

The purpose of my invention is to provide an instrument, somewhat similar to the well-known carpenter's level, but employing a gyro arrangement by which horizontal degrees roll, and vertical pitch may be determined from a single instrument that in use is intended to be manually manipulatable by the operator to solve problems in construction, piping, road grading, and the like. As previously mentioned above, a carpenter's level with bubble devices cannot determine angles within a horizontal plane. My invention may be coupled with bubble devices, if desired, but a single gyro suitably mounted to give an indication of degrees within a horizontal plane while a bubble device gives to a limited extent both indications of roll and vertical pitch; or a pair of gyros, one giving the horizontal degrees and the other giving roll and vertical pitch; or three gyros, one giving horizontal degrees, a second giving degrees of roll and a third giving the degrees of vertical pitch; these will enable one to make the various angular determinations discussed herein.

In the instance of the pair of gyros mentioned above, or in the instance of the three gyros also mentioned above, these may be used without bubble devices, but the inclusion of a bubble device may be additionally preferred for orientation of the instrument with the earth.

SUMMARY OF THE INVENTION

My invention, therefore, is a manually manipulatable instrument for solving a construction problem involving determining the orientation in space of an unknown geometrical plane with reference to a known geometrical plane, or using a known or unknown geometrical plane as a reference and establishing in space a geometrical plane parallel to the known or unknown plane, or establishing in space a geometrical plane having a predetermined orientation with reference to the known or unknown geometrical plane. The instrument may be used by pipefitters, carpenters, builders, land and road graders, and the like. The instrument has a support that defines at least one straight planar surface, which is to be used as a reference surface; a gyroscope arrangement that is operatively connected to and supported by the support; a drive arrangement for the gyroscope arrangement to supply the power to spin the wheel or wheels of the gyroscope arrangement to a continuous stabilized condition relative to the straight planar surface of the support means in any fixed position and location assumed by the straight planar surface of the support means at the time the gyroscope arrangement becomes stabilized; and an indicator arrangment for indicating the orientation in space of the straight planar surface of the support relative to its orientation in its fixed position when the support is moved out of the above-mentioned fixed position.

The support may also include at least one bubble device for assisting in determining the orientation in space of the straight planar surface of the support.

Preferably, the gyroscope arrangement enables the user to determine degrees in a horizontal plane, degrees in the vertical plane or vertical pitch angle and roll.

For purposes of the discussion herein, a "plane" is such that the straight line that joins any two of its points lies wholly in that surface. It also may be known as a "flat" surface. Further, a "plane" is completely determined by any three points which do not lie in a straight line; or by a given straight line and a point not on that line; or by two parallel lines. The aforementioned definitions of a "plane" are important in the sense that the gyros which are discussed herein, technically only locate or point out a line in space, but when coupled with the "at least one straight planar surface" of the instrument will serve to locate or point out or establish planes in space with reference to the resulting orientation in space of the "at least one straight planar surface".

DESCRIPTION OF THE PREFERRED EMBODIMENT

Figure 1:
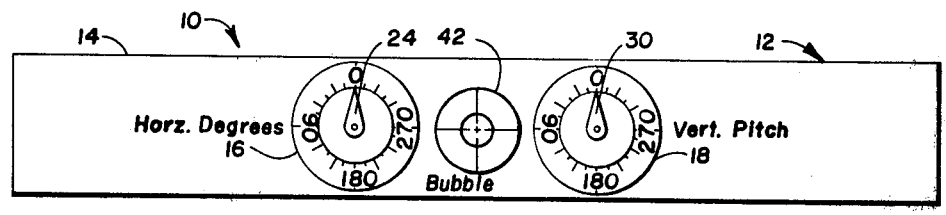
FIG. 1 illustrates a plan view of the gyro-stabilized indicating apparatus or instrument showing the dials for horizontal and vertical pitch angular indicators and a bubble device for the roll indication.

In the reference to the drawings, in FIG. 1 the instrument of the invention is shown at 10, the support of the instrument is indicated in general at 12 and at least the front or straight surface 14 of the support is straight or lies in a flat plane for use as a reference surface. The instrument illustrated is shown as having two dials 16 and 18, dial 16 for indicating degrees in the horizontal plane and dial 18 for indicating degrees in the vertical plane or vertical pitch. The gyro for dial 16 is indicated in general at 20, and the gyro for dial 18 is indicated in general at 22. The indicating needle 24 for gyro dial 16 is operatively connected to the gimbal frame 26 so that as the support 12 of the instrument is manually rotated or manipulated in the horizontal plane the gimbal frame 26 and the indicating needle 24 are rotated relative to the gyroscope axle 28 which points to a fixed position in space once the gyro has achieved spinning stability.

The indicating needle 30 for gyro dial 18 is operatively connected through a right angle cone gear drive set 32 to the gimbal frame 34 so that as support 12 of the instrument is manually rotated or manipulated in the vertical plane, the gimbal frame 34 and the indicating needle 30 are rotated relative to the gyroscope axle 36, which also points to a fixed position in space once the gyro has achieved spinning stability.

Since the operating principles of gyroscopes are well known, no further discussion other than that previously given is thought to be necessary in this description.

Figure 2:
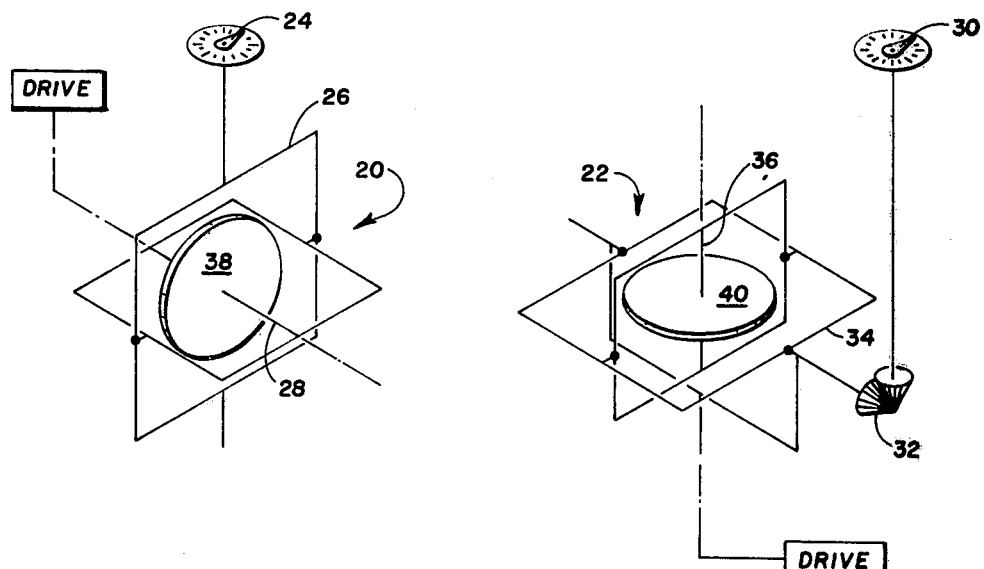
FIG. 2 is a diagrammatic blow-up of the gyro arrangement and the indicator needles, the horizontal degrees gyro being illustrated on the left and the vertical pitch gyro being illustrated on the right.

The drive arrangement by which the gyros may be driven until they achieve continuous stabilized condition may be by means of an electrical motor, as indicated in FIG. 2 by the blocks labeled DRIVE, or the wheel or rotor 38, 40 of the gyros may be driven by air jets against their rims. In the latter case, the rims could be provided with "buckets" (not shown) against which the air jets would cause the wheels to rotate at high speed. The source of power for the electrical motor could be self-contained batteries or an outside electrical source. An electrically driven gyro, for instance, may be built like an inside-out electric motor, the wire-wound stator fixed inside the revolving rotor, which is driven by induction. Since the nature of the use of the instrument may generally be a short one, the gyros could be spring wound.

Also, the gyros may be suitably damped (not shown) in a well-known way against undesirable oscillations in order to achieve a degree of stability long enough to make the desired angular determinations.

A bubble device is shown at 42 and may be a "bull's-eye" type device wherein the bubble indicates level of the instrument, when it is centered with respect to the cross-hairs illustrated, or deviation from level. Other types of bubble devices may be used.

OPERATION

In using the gyro-stabilized apparatus or instrument 10, the operator starts the gyros running. When the gyros reach designed speed at which stabilization is to occur, which is indicated by both indicator needles 24, 30 each maintaining a fixed position, the operator then "zeroizes" each gyro by manually rotating each dial (16, 18) until the zero (0°) on the dial is positioned opposite the indicator needle and the bubble device 42 is noted to see where the bubble is with respect to the intersection of the cross-hairs. Whatever "fixed position" in which the front or straight planar surface 14 of the instrument support 12 happens to be at the time when such stabilizing and zeroizing of the dials opposite the stabilized indicator needles occurs along with a noting of the bubble device may then represent the "reference position". Desired angular orientations of structures and surfaces at other locations in the horizontal and vertical planes along with noting the position of the bubble from the "fixed position" may be determined relative to the "reference position". The bubble device 42 may be used to determine zero degrees (0°) roll.

For instance, supposing the operator has positioned the instrument so that its front planar surface 14 and its bottom surface (not shown) (assuming it also to be flat and at right angles with regard to the front planar of the instrument support) on the floor against a wall known to be at a 90° right angle with respect to the floor, which is known to be flat and is found to be level by the bubble device. After the instrument is zeroized at that "fixed position" or "reference position", the instrument is then moved over the floor to position the front planar surface 14 of the instrument against an adjacent connecting wall to the left of the operator when he was facing the first-mentioned wall, known to be at right angles (90°) relative to the first wall. The horizontal indicator needle 24 should then be pointing at 90°, while the vertical pitch indicator needle 30 will continue to read opposite the zero (0°) and the bubble device reads zero (0°) or level because no change occurred in the pitch indication, assuming the floor at the second position also to be flat and on the same plane as the floor at the "reference position". The bubble device 42 will also show zero degrees (0°) roll and also verifies "level", which can be both roll and pitch. Assuming, therefore, the readings of horizontal degrees and vertical pitch to be exactly 90° and 0° respectively as in the manner described above, this then verifies the operation and accuracy of the instrument. The problem thus involved using known geometrical planes (the floor and the wall at the "fixed" or "reference position") as a reference, and then establishing in space known geometrical planes (the floor and the wall at the second position).

Taking a more difficult problem, the front planar surface of the instrument may be positioned across the end face at the center or axis of a cylindrical pipe or conduit that has been cut along a flat plane but at unknown angles both in the horizontal and vertical planes. The instrument is zeroized at that fixed or reference position and level or extent of deviation from level is noted. The instrument is then moved to another location and oriented in space to assume the same zeroized position and thus "establish" with its front planar surface 14 a plane that is parallel with the one made by the end face of the cylindrical pipe or conduit. Another reading may be taken across the end face of the center or axis of the first pipe at right angles to the first reading, in case the overall plane should be an oblique plane, and then a similar measurement at the second pipe. If another cylindrical pipe or conduit of the same diameter and thickness is cut accurately along the plane "established" by the instrument, the end surface of both cylindrical pipes or conduits should match exactly when brought together. The problem thus involved using unknown geometrical planes (the end face of the first-mentioned cylindrical pipe or conduit at the "fixed" or "reference position") as a reference, and then establishing in space unknown geometrical planes (the subsequently cut second pipe or conduit) parallel to the unknown geometrical planes.

Figure 3:
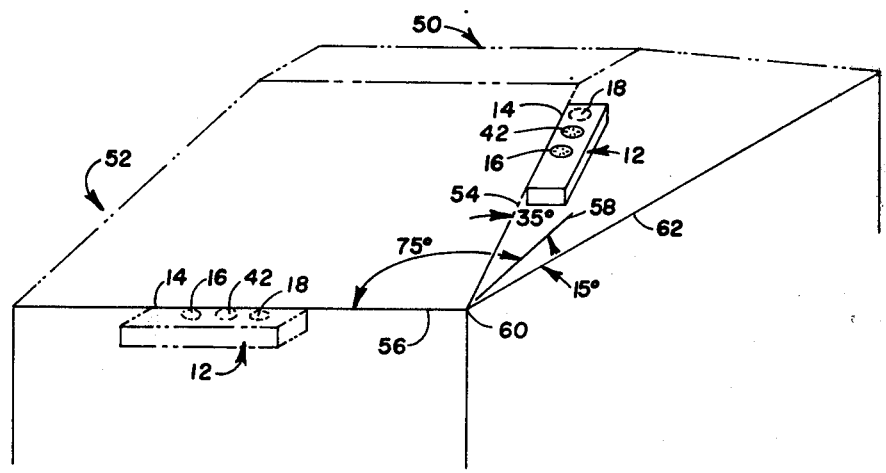
FIG. 3 shows one example of how the instrument of the invention may be used to solve a construction problem with respect to a roof on a house or building.

Looking at FIG. 3 for still another application of the instrument, the problem concerns forming the framework of the roof 50 of the building 52 so that the end rafter which is diagrammatically indicated at 54, is positioned at 75° in the horizontal plane with respect to the front frame member, as diagrammatically indicated at 56, and is at 35° in the vertical plane relative to the imaginary line 58. The instrument 10 is shown in phantom lines as the front planar surface 14 is positioned against the front frame member 56 and then zeroized. The front planar surface of the instrument may then be positioned against the end rafter 54 with one butt end of the rafter positioned against and being pivoted about a point 60, which represents one end of the front frame member 56 and intersection with its adjacent right-angled side frame member 62. The end rafter may be manually moved until the horizontal dial of the instrument positioned against the rafter reads 75° and the vertical dial of the instrument reads 35°, then the end rafter is suitably secured in that position. The problem thus involved using known geometrical planes (the position of the front frame member 56) as the "fixed" or "referenced position", and then establishing in space geometrical plane (of the end rafter) having predetermined orientations with reference to the known geometrical planes. The bubble device 42 may indicate "roll" to a limited extent, whereas alternate embodiments, which will be described herein, are not so limited.

The instrument may also be positioned along the top edge of the blade of a road grader or of a bulldozer so as to establish a desired grade of the land with respect to some other point or surface of land. The operator may visually sight the dials of the instrument from his seat on the vehicle and adjust the blade accordingly until the indicator needles read the necessary angular orientations. Of course, if the dials are too far for the operator to read from his vehicle seat, suitable electrically operated dials could be provided on the instrument panel of the vehicle to "transmit" the readings from the dials on the instrument. This, of course, would be a much more sophisticated approach to use of the instrument. In U.S. Pat. No. 2,904,911, the patentee Colee discloses a gyroscopic control mechanism for a road grading apparatus. The difference between the patented disclosure and the subject invention disclosed in this specification is that the gyro involved in the patent is connected to a mechanism for automatically adjusting the blade to a selected plane extending in the direction of the road grader movement along the ground. The subject invention, however, is controlled by manual manipulation of the instrument and the operator makes his own determinations.

The uses described herein illustrate just a few of the many possible uses that may be made of this invention, limited only by the imagination and ability of the operator using the instrument.

Figure 4:
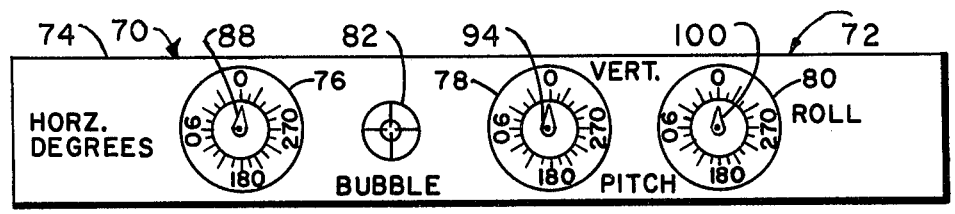
FIG. 4 illustrates a plan view of an alternate gyro-stabilized indicating apparatus or instrument showing the dials for horizontal, vertical pitch and roll angular indicators.

In the alternate embodiment shown in FIG. 4, the instrument of the invention is shown at 70, the support of the instrument is indicated at 72 and at least the front or straight surface 74 of the support is straight or lies in a flat plane for use as a reference surface. The instrument is shown as having three dials 76, 78 and 80 and a bubble device 82. Dial 76 is for indicating degrees in the horizontal plane; dial 78 is for indicating degrees in vertical pitch; and dial 80 is for indicating degrees roll.

Figure 5:
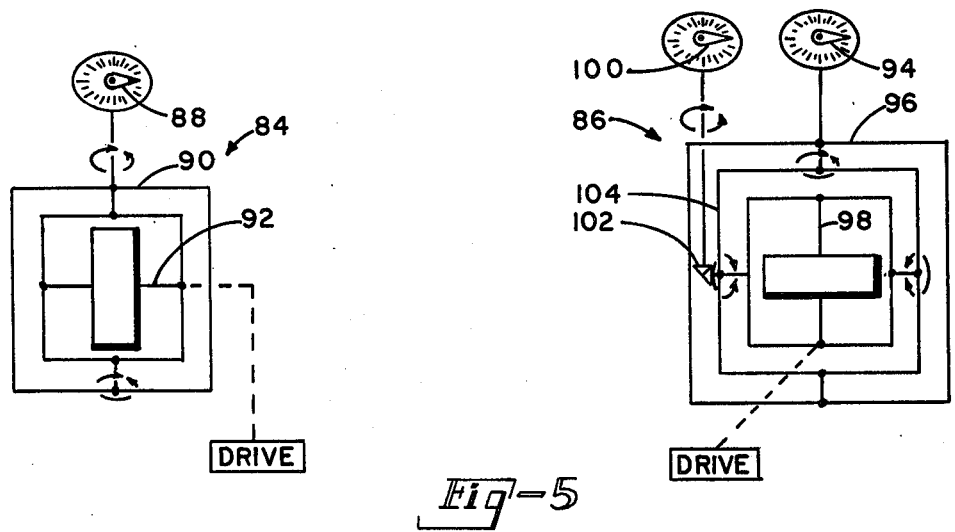
FIG. 5 is a diagrammatic blow-up in elevation of a gyro arrangement and the indicator needles for use with the instrument shown in FIG. 4, the horizontal degrees gyro being illustrated on the left, and the roll and vertical pitch gyro being illustrated on the right.

In reference to FIG. 5, the gyro for dial 76 in FIG. 4 is indicated in general at 84; and the gyro for dials 78 and 80 in FIG. 4 is indicated in general at 86. The indicating needle 88 for gyro dial 76 is operatively connected to the gimbal frame 90 so that as the support 72 of the instrument is manually rotated or manipulated in the horizontal plane the gimbal frame 90 and the indicating needle 88 are rotated relative to the gyroscope axle 92 which points to a fixed position in space once the gyro has achieved spinning stability.

The indicating needle 94 for gyro dial 78 in FIG. 4 is operatively connected to the gimbal frame 96 so that as support 72 of the instrument is manually rotated or manipulated in the vertical pitch plane, the gimbal frame 96 and the indicating needle 94 are rotated relative to the gyroscope axle 98, which also points to a fixed position in space once the gyro has achieved spinning stability. The indicating needle 100 for gyro dial 80 in FIG. 4 is operatively connected through a right angle cone gear drive set 102 to the gimbal frame 104 so that as support 12 is manually rotated or manipulated in the roll plane, the gimbal frame 104 and the indicating needle 100 are also rotated relative to the gyroscope axle 98.

Figure 6:
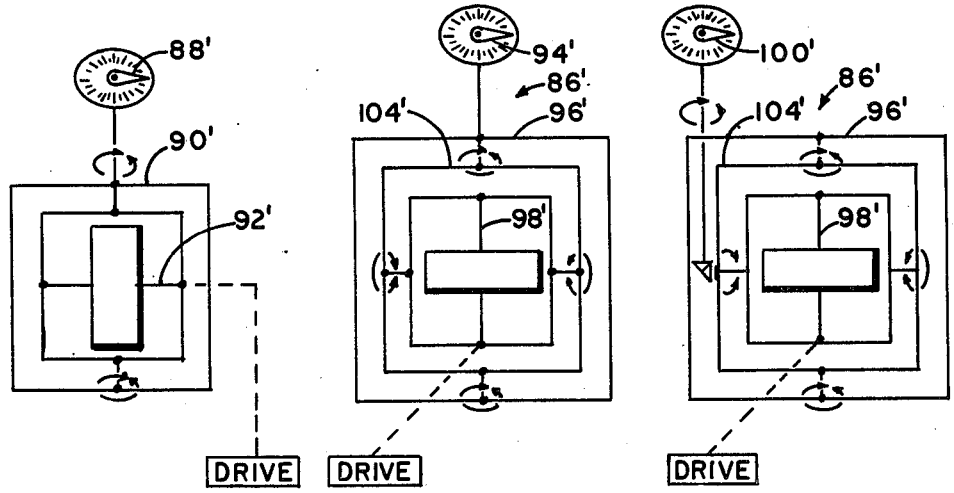
FIG. 6 illustrates still another diagrammatic blow-up in elevation of a gyro arrangement and the indicator needles for use with the instrument shown in FIG. 4, the horizontal degrees gyro being illustrated on the left, the vertical pitch gyro being illustrated in the middle, and the roll gyro being illustrated on the right.

In reference to FIG. 6, the gyro for dial 76 in FIG. 4 would be the same as that shown in FIG. 5. Therefore, the same reference numerals are used to identify corresponding elements but with prime marks thereafter to show a different embodiment.

Also in FIG. 6, two gyros replace the single gyro shown in FIG. 5 for the dials 78 and 80 shown in FIG. 4. The only difference is that each gyro only has one of the indicating needles operatively connected to a gimbal frame, either for giving an indication of vertical pitch or an indication of roll. Therefore, the same reference numerals are used to identify corresponding elements from FIG. 5, but with prime marks added thereafter to show that it represents a different embodiment.

The invention has been described in detail with particular reference to certain preferred embodiments thereof, but it will be understood that variations and modifications can be effected within the spirit and scope of the invention.

I claim:
1. A manually manipulatable instrument for solving a construction problem involving determining the orientation in space
   of an unknown geometrical plane with reference to a known geometrical plane,
   or using a known or unknown geometrical plane as a reference and
   either establishing in space a geometrical plane parallel to the known or unknown geometrical plane or establishing in space a geometrical plane having a predetermined orientation with reference to the known or unknown geometrical plane, such as for pipe fitters, carpenters, builders, land and road graders, and the like, the instrument comprising:
   a support means defining at least one straight planar surface as a reference surface;
   means connected to said support means for determining orientation of said support means in three different planes, each plane being at right angles with respect to each of the other two planes, said means for determining orientation including a gyroscope suitably supported to have free movement to determine orientation of the support means in one of said three different planes, a second gyroscope for determining said orientation in a second of said three different planes and a third means for determining said orientation in the third of said three different planes;
   means for driving said gyroscopes to a continuous stabilized condition relative to the straight planar surface of said support means in any fixed position and location assumed by the straight planar surface of the support means at the time the gyroscopes become stabilized; and
   means connected to said support means, to said gyroscopes and to said third means for indicating said orientation in space of the straight planar surface of said support means relative to its orientation in its fixed position when the support means is moved out of said fixed position.

2. An instrument as defined in claim 1 wherein said means connected to said support means and to said gyroscopes includes manually rotatable dials having degree indications around the faces of the dials and indicator needles operatively connected to said gyroscopes and independently movable relative to the degree indications on the faces of the dials.

3. An instrument as defined in claim 1, wherein said third means for determining said orientation includes a bubble device.

4. An instrument as defined in claim 1, wherein said third means for determining said orientation comprises means to mount said second gyroscope for free movement in two of said three different planes.

5. An instrument as defined in claim 1, wherein said third means for determining said orientation includes a third gyroscope suitably supported to have free movement in the third of said three different planes and having means for driving said third gyroscope to a continuous stabilized condition.

* * * * *